C. VAN ORDER & J. W. DINNEEN.
Harrows.
No. 146,965. Patented Jan. 27, 1874.
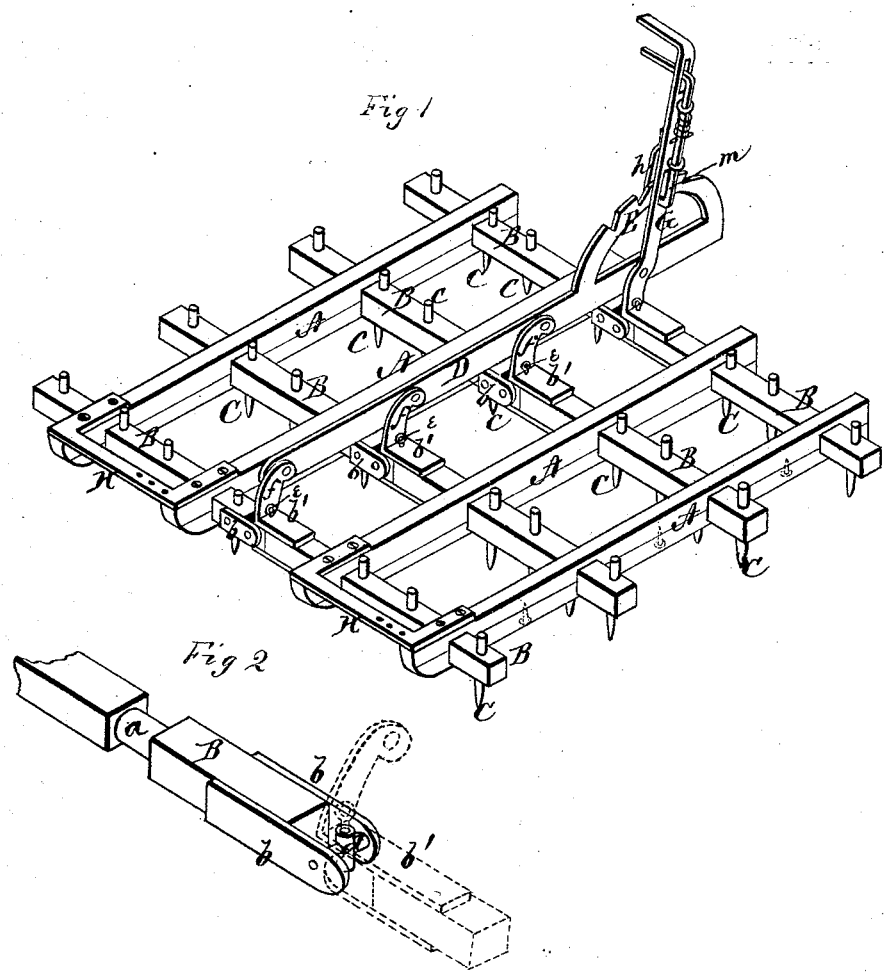

UNITED STATES PATENT OFFICE.

CYRUS VAN ORDER AND JERROLD W. DINNEEN, OF ALBANY, ILLINOIS.

IMPROVEMENT IN HARROWS.

Specification forming part of Letters Patent No. 146,965, dated January 27, 1874; application filed August 13, 1873.

*To all whom it may concern:*

Be it known that we, CYRUS VAN ORDER and J. W. DINNEEN, of Albany, in the county of Whitesides and in the State of Illinois, have invented certain new and useful Improvement in Harrows; and do hereby declare that the following is a full, clear, and exact description thereof, reference being had to the accompanying drawings and to the letters of reference marked thereon, making a part of this specification.

The nature of our invention consists in the construction and arrangement of a sectional harrow, in which the teeth may all be regulated or set at once to any slant desired, as will be hereinafter more fully set forth.

In order to enable others skilled in the art to which our invention appertains to make and use the same, we will now proceed to describe its construction and operation, referring to the annexed drawing, in which—

Figure 1 is a perspective view of our harrow complete, and Fig. 2 shows a part of one of the bars with teeth of the harrow.

Our harrow is, in fact, composed of two harrows, or two halves, which are coupled together and form one whole. Each half-harrow is composed of two longitudinally-bisected bars, A A, and a series of cross-bars, B B, passing through them. The cross-bars B B are made square, as shown, except the portions which pass through the bars A A, and these portions are turned round, as shown at *a* in Fig. 2, to allow of the bars B B turning in the same. The two halves of each bar A are fastened together, after the cross-bars B B have been placed therein, by means of screws or other suitable fastenings. Each cross-bar B is provided with a series of harrow-teeth, C C, as shown.

The two halves of the harrow are coupled together by the following means: To the end of each cross-bar B of one half-harrow are attached two plates or metal bars, *b b*, one on the front and the other on the rear side of the cross-bar, and between these plates is pivoted a cross, *d*, the vertical part of which is tubular. On the end of each cross-bar of the other half-harrow are attached two other metal plates, *b' b'*, one on the top and the other on the bottom of the bar, and a pin, *e*, is passed through these plates, said pin also passing through the tubular part of the cross *d*, which is inserted between said plates.

By withdrawing the pins *e e*, the two halves of the harrow are separated; and when united together, either half may be raised, so as to accommodate the harrow to the inequalities of the ground.

Each of the top plates *b'* has at its outer end an arm, *f*, which projects upward and rearward, and their upper ends are pivoted to a long bar, D, which, at its rear end, is provided or formed with a notched or toothed semicircle, E. The rearmost of the arms *f* is extended and forms a lever, G, which is provided with a guard, *h*, to pass over the edge of the semicircle E, and thus hold the lever to the same. The lever is also provided with a spring-pawl, *m*, to engage in the notches or teeth of the semicircle E.

By these means the teeth of the harrow may be adjusted or set at any angle, and the harrow regulates itself for heft by the set or slant of the teeth.

In spring plowing, where there are corn-stalks, &c., by setting the teeth back they will clean themselves; and in fall plowing, where the ground is very hard, in setting the teeth to slant forward, they will run to any desired depth without extra weight. Also, in any kind of work where it is necessary to clean often, it saves a great deal of labor. By touching the spring-pawl *m*, the teeth fall to the ground, and clean themselves without the labor of raising the harrow from the ground.

The harrow is drawn by an ordinary evener, attached to a bar, H, on each half, and the team hitched to said evener in the ordinary manner.

Having thus fully described our invention, what we claim as new, and desire to secure by Letters Patent, is—

The combination, with the two harrow-sections A B C, of the metal plates or bars *b b* and *b' b'* and the cross *d*, with pin *e*, all constructed and arranged substantially as and for the purposes herein set forth.

In testimony that we claim the foregoing we have hereunto set our hands this 4th day of August, 1873.

CYRUS VAN ORDER.
    J. W. DINNEEN.

Witnesses:
 C. L. EVERT,
 A. N. MARR.